C. A. MARIEN.
PISTON FOR ENGINE CYLINDERS.
APPLICATION FILED JUNE 9, 1919.
1,371,320. Patented Mar. 15, 1921.
2 SHEETS—SHEET 1.
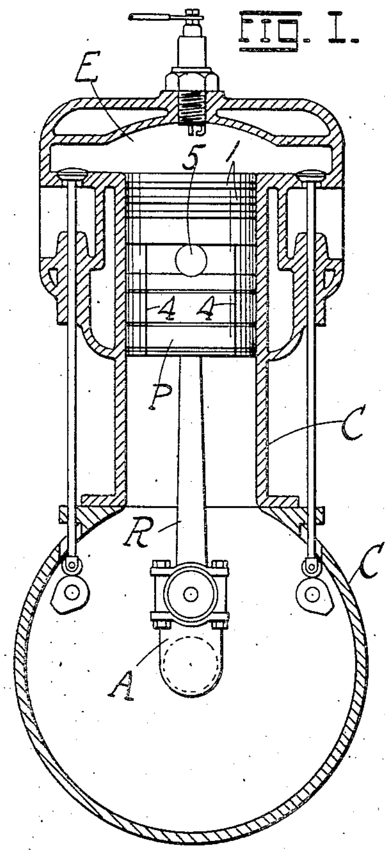
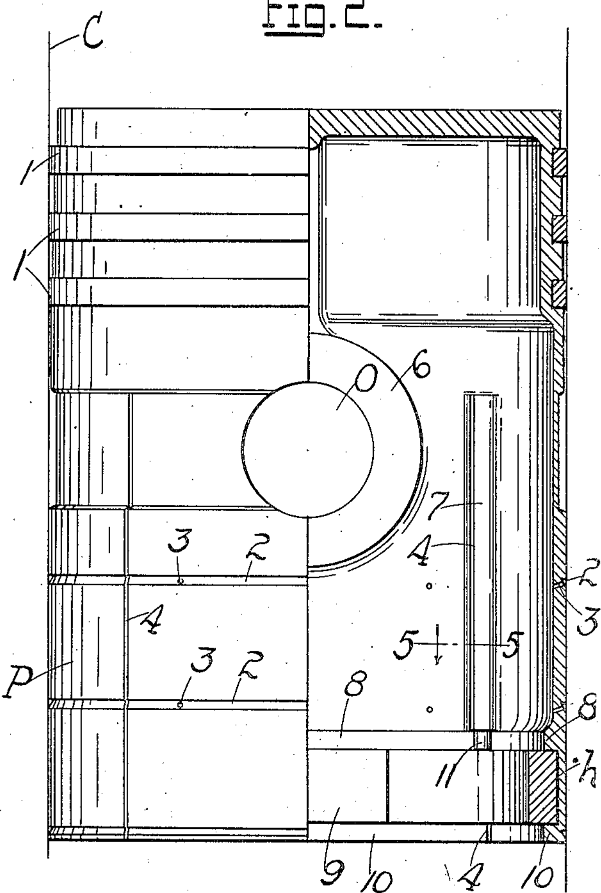
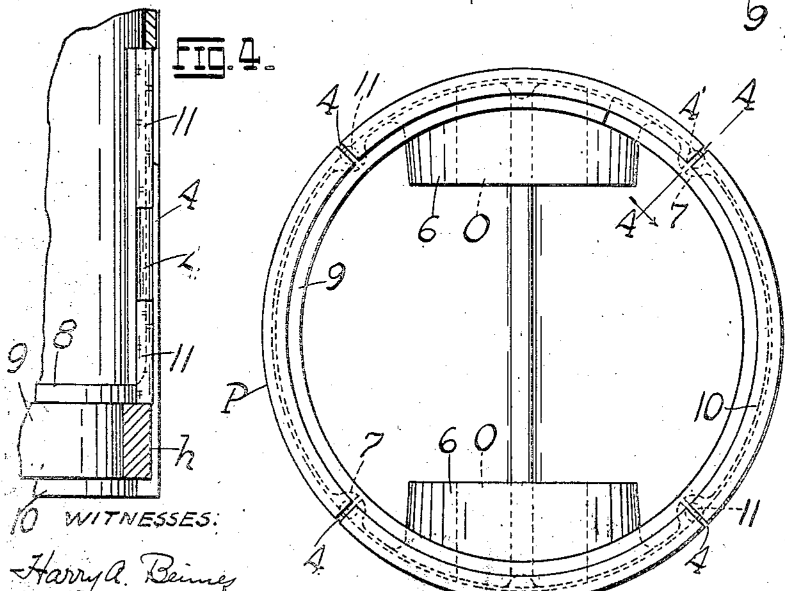
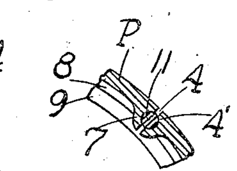
WITNESSES:
Harry A. Beime
E. H. Healton
INVENTOR.
Chas. A. Marien.
BY Emil Starek
ATTORNEY.

C. A. MARIEN.
PISTON FOR ENGINE CYLINDERS.
APPLICATION FILED JUNE 9, 1919.
1,371,320. Patented Mar. 15, 1921.
2 SHEETS—SHEET 2.
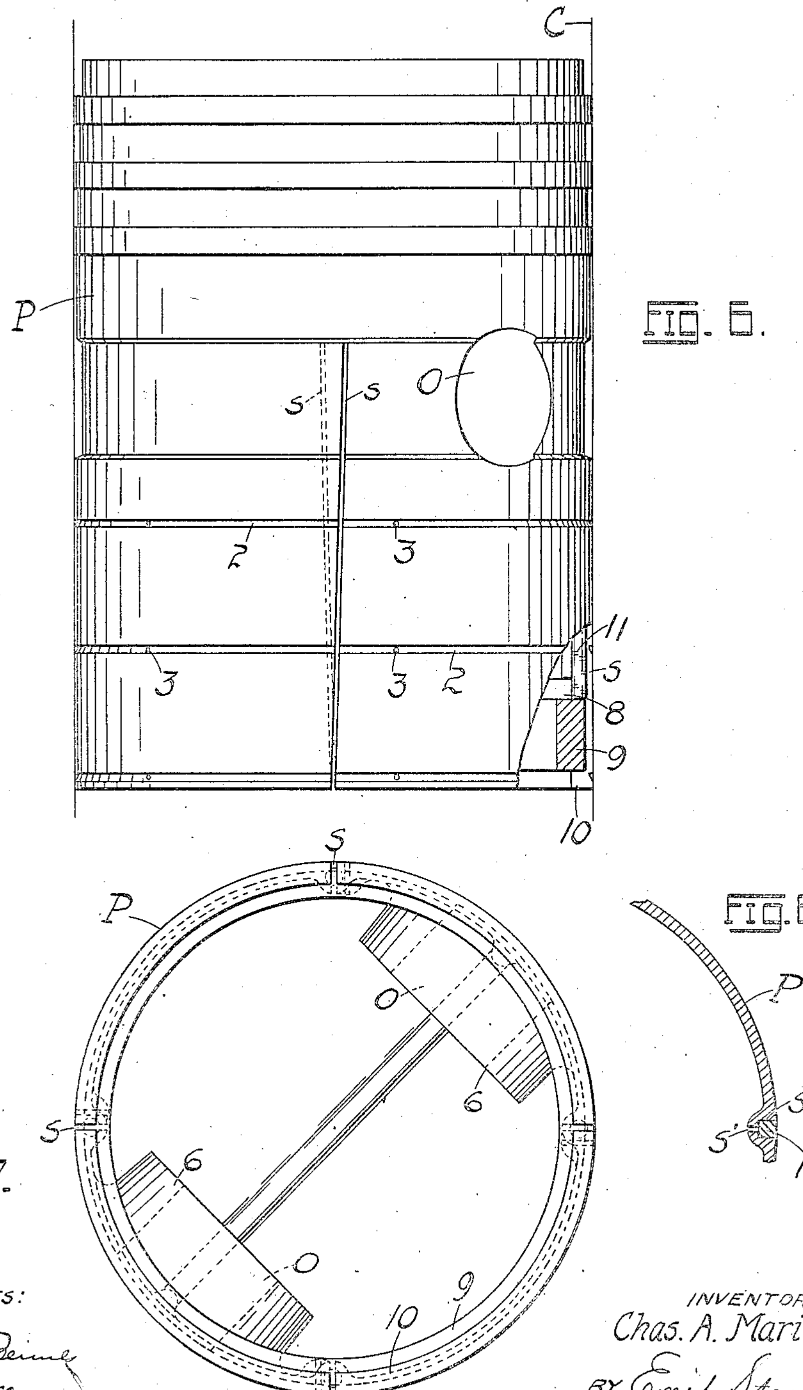
WITNESSES:
Harry A. Reimer
C. H. Callum
INVENTOR.
Chas. A. Marien.
BY Emil Starek
ATTORNEY.

UNITED STATES PATENT OFFICE.

CHARLES A. MARIEN, OF ST. LOUIS, MISSOURI, ASSIGNOR TO H. & H. MACHINE COMPANY, OF ST. LOUIS, MISSOURI, A CORPORATION OF MISSOURI.

PISTON FOR ENGINE-CYLINDERS.

1,371,320. Specification of Letters Patent. Patented Mar. 15, 1921.

Application filed June 9, 1919. Serial No. 302,904.

*To all whom it may concern:*

Be it known that I, CHARLES A. MARIEN, a citizen of the United States, residing at St. Louis, State of Missouri, have invented certain new and useful Improvements in Pistons for Engine-Cylinders, of which the following is a full, clear, and exact description, reference being had to the accompanying drawings, forming a part hereof.

The present invention is directed to improvements in piston construction, and particularly to pistons intended for use in internal combustion engines. The objects of the invention are to provide a piston that will operate in its cylinder without side-slapping or knocking (an objection so frequently encountered in practice especially in the case of automobiles heavily loaded and climbing a grade); one provided with a longitudinally slit skirt bearing resiliently against the walls of the cylinder, so that while permitting a free lubrication to be maintained between the piston and cylinder walls, it serves to prevent passage of any injurious quantities of the lubricant into the combustion chamber; one making provision in the skirt to return any excess of lubricant back to the crank-case; and one possessing further and other advantages better apparent from the following detailed description of the invention in connection with the accompanying drawings in which—

Figure 1 represents a middle longitudinal section through the cylinder and crank-case of an internal combustion engine, showing one form of my invention applied thereto; Fig. 2 is a half elevation and half middle longitudinal section of a piston showing my invention on a large scale; Fig. 3 is an end view of the piston on the side facing the crank-case; Fig. 4 is a longitudinal sectional detail on the line 4—4 of Fig. 3; Fig. 5 is a cross-sectional detail on the line 5—5 of Fig. 2; Fig. 6 is an elevation of a piston showing a modified form of my invention; Fig. 7 is an end view of the piston on the side facing the crank-case; and Fig. 8 is a cross-sectional detail similar to the section in Fig. 5, showing a modified form of slit for the piston skirt.

Referring to the drawings, and for the present to Figs. 1 to 5 inclusive, C represents the cylinder, C′ the crank-case, P, the piston, and R, the connecting rod coupling the piston to the crank-arms A, as well understood in the art. The upper portion of the piston is provided with any conventional form of packing ring 1 (three rings being shown in the present example), the lower portion or skirt of the piston (the portion nearest the crank-case) being provided with annular peripheral oil-distributing grooves 2 from which lead ducts 3 to the interior of the piston to return any excess oil back to the crank-case. These features I do not claim as they do not constitute a part of the present invention, the latter being concerned with the slitting or slotting of the skirt portion of the piston.

In the form of the invention shown in the figures above referred to, the skirt of the piston is formed with a plurality of longitudinally disposed parallel slots 4 (four in the present example), said slots extending from a point substantially opposite the piston pin 5 (inserted through the openings 0 of the bosses 6) to the free end of the skirt (Fig. 1), the walls of the skirt at the slots being reinforced on the inside by ribs 7 which terminate with their outer ends at the annular ledge 8 formed on the inside of the skirt a suitable distance from the free end thereof. The ledge 8 forms the inner bounding wall of a groove *h* formed for the reception of an expansion ring 9 carried at the free or outer end of the skirt, the outer bounding wall of said groove being formed by the inwardly turned flange 10 at the free end of the skirt. The walls of the slots 4 are formed with cylindrical enlargements 4′, said enlargements receiving filler strips of felt or equivalent compressible and oil-absorbing material 11, said strips 11 serving to arrest the splashing (from the crank case) of undue quantities of oil through the slots 4 against the cylinder walls, and hence reducing the danger of an objectionable flow of oil past the lubricating surfaces of the piston into the combustion chamber E of the engine. The strips 11 extend from the inner closed terminals of the slots 4 past the ribs 7 and to the inner side wall of the ring 9, the balance of the slots being covered by said ring with the exception of a negligible portion across the flange 10 (Fig. 2).

In practice, the piston is cast slightly over-size, that is to say, slightly larger than the bore of the cylinder, after which the skirt of the piston is slit as here indicated, thereby imparting to the skirt sections between the slits a resiliency which a skirt without the slits does not possess. After the skirt is slit, the sections are slightly sprung inward and held in this position by a suitable jig or band and the piston placed in a lathe and turned true and finished smooth on the outside. When the skirt is released, the parts spring outward so that when the piston is inserted into the cylinder the skirt hugs the walls thereof with a uniform resilient contact the full length of the slits, thereby preventing side slapping or knocking when in service. The strips of felt 11 are of course inserted into the several passages 4′ forming the enlargements of the slits 4, and the expanding ring 9 is inserted into the groove *h* formed for its reception on the inside of the skirt. The strips 11 prevent excess of oil finding its way between the cylinder walls and the piston, and oil which oozes through the strips and discharges against the walls of the cylinder is in a large measure returned to the crank case through the ports or ducts 3 leading from the grooves 2 through the walls of the skirt. The pressure of the skirt sections against the walls of the cylinder is such that while the desired quantity of oil is permitted to flow or pass between the piston and cylinder for maintaining lubrication of the rubbing surfaces, no appreciable quantity of the lubricant can find its way past the piston into the combustion chamber E. The purpose of the ring 9 of course is to supplement the outward spring of the skirt sections formed between the slits, this supplemental action of the ring becoming more important as the outer surface of the skirt wears away, when the skirt sections or spring members can no longer exert their initial pressure against the cylinder walls.

In the form of the invention above described, it will be observed that the slits or slots 4 are disposed parallel to the elements of the cylinder formed by the walls of the piston, that is to say, they are parallel to the axis of the piston. This arrangement may in time cause the formation of ridges on the cylinder walls opposite the slots, and to obviate such a result I may dispose the slits at a slight incline as shown at *s* in the modification covered by Figs. 6 and 7. The inclination of the slits *s* in these figures is of course exaggerated and in practice it need only be sufficient to insure the prevention of a rib formation of the width of the slit. Since the piston reciprocates rectilinearly in lines parallel to the axis of the cylinder, it follows that an inclined slit such as *s* would cause the metal on either side thereof to rub over the parts of the cylinder walls opposite the slit, and thus prevent the formation of any rib on the inner surface of the cylinder. In other respects the piston in the modification referred to is the same as the first form described, and corresponding parts are identified by the same reference numerals.

In the structures above described, the felt strips 11 are out of contact with the cylinder walls and must moreover be inserted into the slit enlargements or passage-ways through the outer ends of the latter. In Fig. 8 however I show a modification in which the slit *s′* is formed into an enlarged groove or depression *s″* opening outwardly through the wall of the skirt of the piston P′, the felt strip 11′ being inserted into the groove from the side. While this facilitates the insertion of the felt, the arrangement has some drawbacks in that grit and solid particles adhering to the felt tend to unduly scour the inner walls of the cylinder forming streaks or grooves which of course are objectionable. In the absence of grit however the arrangement is an admirable one as the felt strips 11′ may be quickly applied. In this modification (Fig. 8) the groove *s″* is shown square in cross-section, but obviously I am not to be restricted thereto.

To provide a slit or divided piston skirt which will resiliently engage the walls of the cylinder so as to not only prevent side-slapping of the piston, but retard the flow of oil sufficiently to prevent undesirable quantities entering the combustion chamber, is the main object of the present invention; and while the slitting of the skirt longitudinally, that is, substantially parallel to the axis of the cylinder or piston, so as to leave outwardly springing members or skirt sections between the slits, is perhaps the best construction, I am not to be restricted as to the particular direction of disposition or number of the slits. In fact, the skirt construction may be modified in many particulars not shown or referred to without in any wise affecting the nature or spirit of the invention.

Having described my invention what I claim is:

1. A piston for engine cylinders provided with a longitudinally slit skirt, the slits being open at the free end of the skirt, and suitable filler strips mounted in the slits.

2. A piston for engine cylinders provided with a longitudinally slit skirt forming resilient members or sections on opposite sides of the slits, and filler strips inserted in said slits and out of contact with the walls of the cylinder.

3. A piston for engine cylinders provided with a skirt slit longitudinally and forming resilient outwardly springing members or sections between successive slits, an expanding ring deposited on the inside of the skirt near the free end thereof to supplement the outward springing action of the sections, the slits aforesaid being provided with enlargements terminating with their outer ends at a point adjacent the inner side wall of the ring aforesaid, and suitable filler strips inserted in said enlargements.

4. A piston for engine cylinders provided with a longitudinally slit skirt forming outwardly springing resilient members or sections between successive slits, and compressible filler strips inserted in said slits and out of contact with the walls of the cylinder.

In testimony whereof I affix my signature, in presence of two witnesses.

CHARLES A. MARIEN.

Witnesses:
EMIL STAREK,
C. H. CALLON.